United States Patent [19]

Kamata et al.

[11] Patent Number: 5,275,369
[45] Date of Patent: Jan. 4, 1994

[54] PROTECTIVE COVER FOR SEAT SLIDING DEVICES

[75] Inventors: Kiyohiko Kamata; Hatsuo Hayakawa; Mikio Honma, all of Yokohama, Japan

[73] Assignee: Ohi Seisakusho Co., Ltd., Yokohama, Japan

[21] Appl. No.: 822,134

[22] Filed: Jan. 17, 1992

[30] Foreign Application Priority Data

Jan. 31, 1991 [JP] Japan .................................. 3-29195
Mar. 28, 1991 [JP] Japan .................................. 3-26544

[51] Int. Cl.5 ............................................. A47B 95/00
[52] U.S. Cl. .................................. 248/345.1; 296/65.1
[58] Field of Search ................ 248/345.1, 424, 429, 248/430, 188.9; 296/65.1

[56] References Cited
U.S. PATENT DOCUMENTS 4,898,417  2/1990  Kudo ........................... 296/97.23
5,188,329  2/1993  Takahara .................... 248/345.1 X

FOREIGN PATENT DOCUMENTS 60-34938  3/1985  Japan .
126935  10/1990  Japan .
051624   5/1991  Japan .
086837   9/1991  Japan .

*Primary Examiner*—Ramon O. Ramirez
*Attorney, Agent, or Firm*—Foley & Lardner

[57] ABSTRACT

A seat sliding device including a stationary rail secured at both ends thereof to a vehicle floor through brackets, a movable rail slidably engaged with the stationary rail and mounting thereon a seat, and a protective cover for covering the bracket and said stationary rail. The protective cover comprises a bracket cover portion covering the bracket, a rail cover portion connected to the bracket cover portion and covering an end portion of the stationary rail, and means for defining a guide groove which provides a space through which the movable rail passes. The protective cover contributes to an improvement in interior appearance and safety of a passenger compartment of vehicles.

8 Claims, 5 Drawing Sheets

PROTECTIVE COVER FOR SEAT SLIDING DEVICES

BACKGROUND OF THE INVENTION

1. Field of The Invention

The present invention relates generally to seat sliding devices and more particularly to a protective cover used in seat sliding devices.

2. Description of The Background Art

Usually, the seat sliding device comprises two pairs of rail units each including a stationary rail secured to a vehicle floor in a longitudinal direction of the vehicle through brackets, and a movable rail mounting thereon a seat and slidably supported on the stationary rail. Upon adjusting the seat position, the movable rail is displaced together with the seat along the stationary rail to a desired position. In order to cover the brackets projectingly mounted on the vehicle floor, there have been proposed protective covers of a type which partially enclose the brackets and respective end portions of the stationary rail. One of the protective covers of this type is disclosed in Japanese Utility Model Application First Publication No. 60-34938.

However, the disclosed protective cover does not enclose the end portions of the stationary rail so that they are exposed in a passenger compartment of the vehicle. Therefore, a passenger tends to suffer damage to his or her body or baggage due to the exposed end portions of the stationary rail. In addition, the exposed end portions of the stationary rail are undesirable in view of the interior appearance of the passenger compartment.

Thus, there has been a demand for a seat sliding device including a protective cover which encloses the bracket and the whole end portions of the stationary rail without restraining sliding movement of the movable rail on the stationary rail.

SUMMARY OF THE INVENTION

It is therefore a principal object of the present invention to provide a seat sliding device, including a protective cover which serves as an improvement in safety for the passanger and which beautifies the interior appearance of the passenger compartment.

In order to accomplish the aforementioned object and other objects, there is provided a seat sliding device including a protective cover which encloses the brackets and the end portions of the stationary rail without restraining sliding movement of the movable rail on the stationary rail.

According to one aspect of the present invention, a seat sliding device includes a stationary rail secured at both ends thereof to a floor through brackets, a movable rail slidably engaged with the stationary rail and mounting thereon a seat, and a protective cover for covering one of the brackets and the stationary rail, wherein the protective cover comprises a bracket cover portion covering the bracket, a rail cover portion connected to the bracket cover portion and covering an end portion of the stationary rail, and means for defining a guide groove which provides a space through which the movable rail passes.

DESCRIPTION OF THE PREFERRED EMBODIMENT

Figure 1:
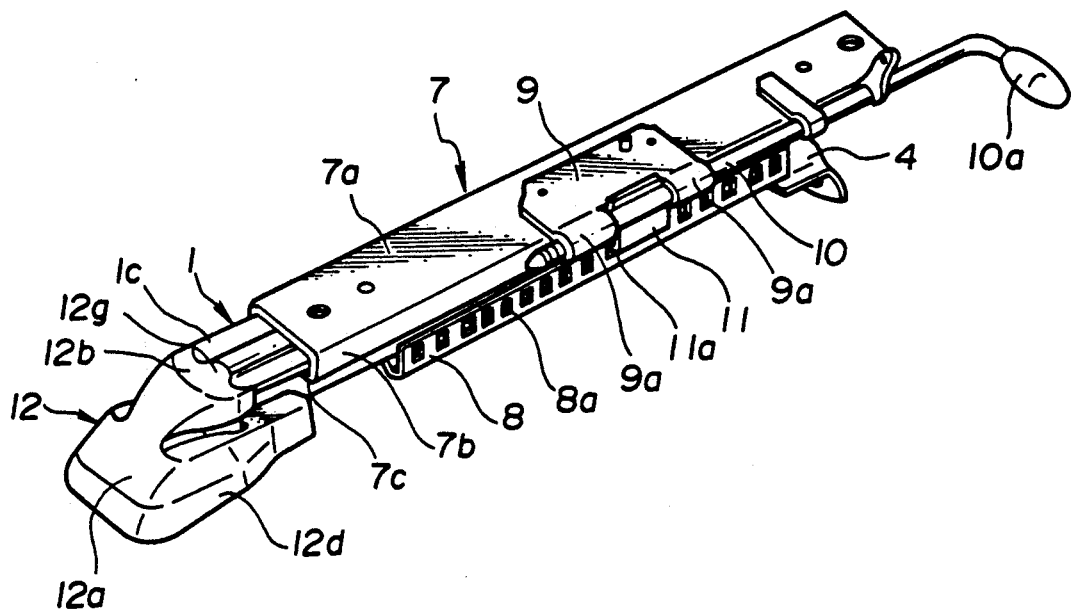
FIG. 1 is a perspective view of a seat sliding device with a protective cover according to one preferred embodiment of the present invention.
Figure 3:
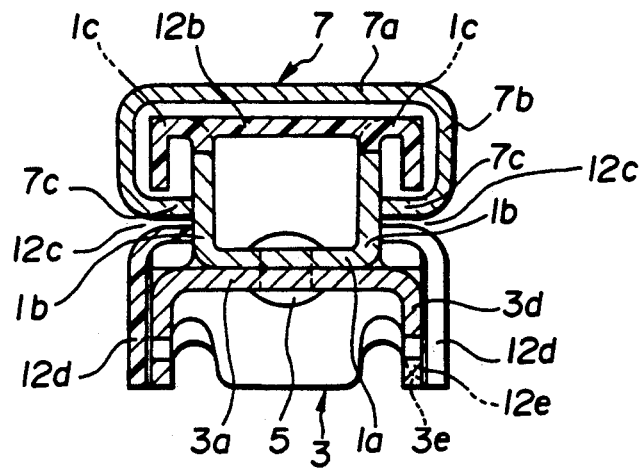
FIG. 3 is a sectional view of the seat sliding device, taken along a line III—III in FIG. 2.
Figure 6:
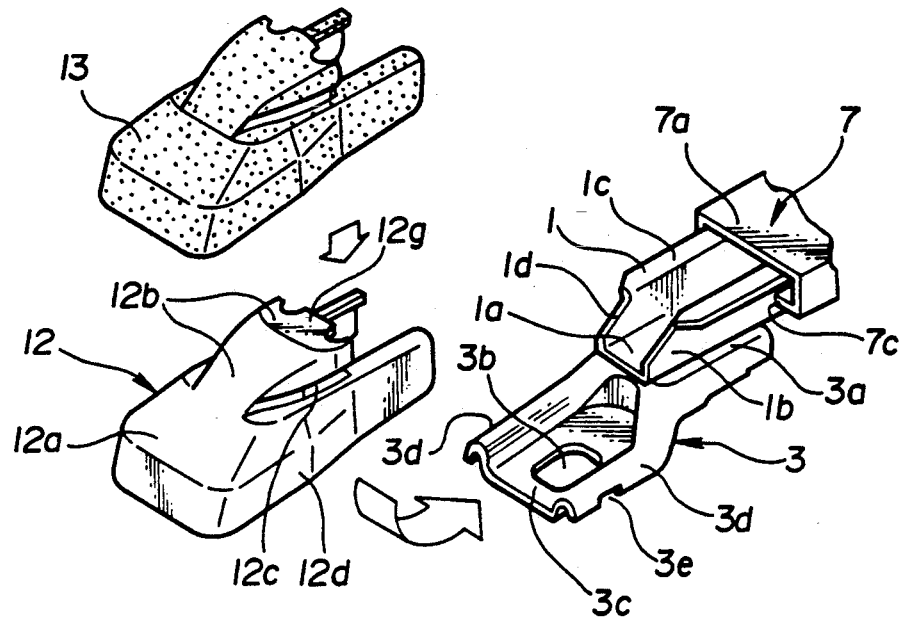
FIG. 6 is a partial perspective view illustrating the seat sliding device, the protective cover and an accessory cover for the protective cover, in disassembled state.

Referring now to the accompanying drawings, particularly FIG. 1, there is shown a seat sliding device. It is to be noted that upon practical use, the device is arranged to support thereon one lateral side of a seat (not shown). As is best shown in FIG. 1, the seat sliding device comprises a stationary rail 1, a movable rail 7, front and rear brackets 4 and 3 and a protective cover 12. Referring to FIG. 3, the stationary rail 1 is of a flanged channel shape which includes a flat bottom wall 1a, parallel side walls 1b extending upwardly from respective sides of the bottom wall 1a, and flanges 1c extending outwardly from the tops of the respective side walls 1b. As shown in FIG. 6, a rear end of the stationary rail 1 is cut at an incline so as to be fitted to a rail cover member of the protective cover 12 as will be described below.

Figure 2:
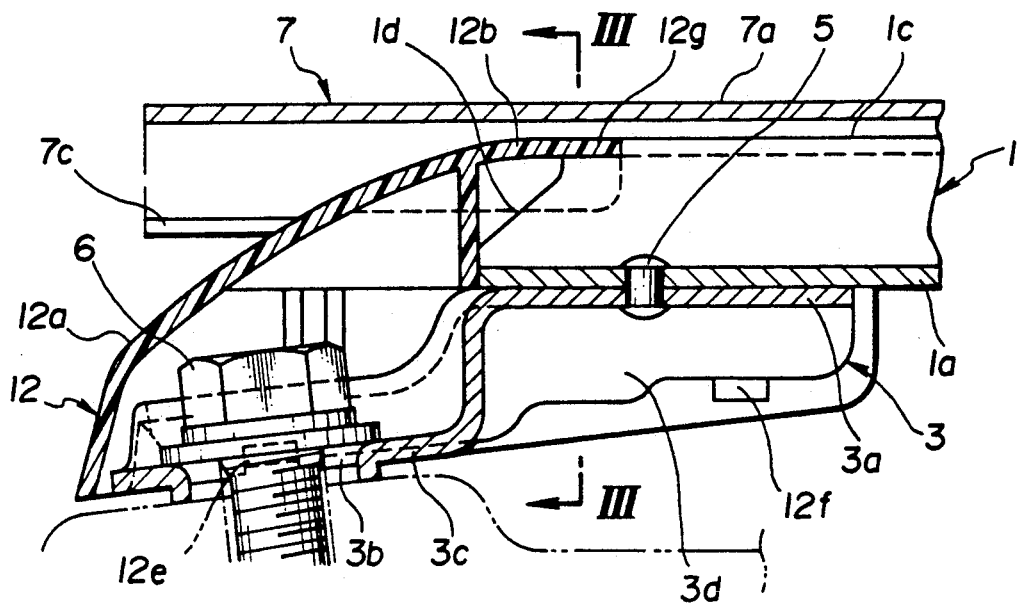
FIG. 2 is a longitudinal sectional view of the seat sliding device as shown in FIG. 1.

Rear and front end portions of the bottom wall 1a of the stationary rail 1 are secured by bolts 5 to the rear and front brackets 3 and 4. The rear bracket 3 is of substantially a rectangular shape in plan view and a crank-like shape in side view. As illustrated in FIGS. 3 and 6, the rear bracket 3 includes a top wall 3a, a bottom wall 3c connected through an intermediate upright wall to a rear end of the top wall 3a and extending rearwardly therefrom, and skirted flanges 3d, 3d extending downwardly or laterally from both sides of each of the top and bottom walls 3a and 3c. The top wall 3a is fixed by the bolt 5 to the bottom wall 1a of the stationary rail 1. The bottom wall 3c has a hole 3b through which a bolt 6 is tightened. The rear and front brackets 3 and 4 each are secured by the bolts 6 to a vehicle floor (not shown), as shown in a phantom line of FIG. 2. The flanges 3d, 3d laterally extending from the bottom wall 3c are provided, on both sides thereof, with notches 3e, 3e which engage pawls 12e, 12e formed on and extending inwardly from an inside of the protective cover 12, as will be described below.

The movable rail 7 has a C-shaped cross section, which includes a top wall 7a mounting a seat thereon, parallel side walls 7b extending downwardly from respective sides of the top wall 7a and flanges 7c extending inwardly toward each other from lower ends of the side walls 7b. Upon assembly, the stationary and movable rails 1 and 7 are interlocked such that flanged side walls of the stationary rail 1 are accomodated within the flanged side walls of the movable rail 7. Balls (not shown) are arranged in spaces defined by the flanged side walls of the stationary rail 1 and the flanged side walls of the movable rail 7. With the interlocking between the stationary rail 1 and the movable rail 7, the movable rail 7 slidably moves on the stationary rail 1 in a longitudinal direction thereof without falling-off of the movable rail 7 from the stationary rail 1 even though a mechanical stress is exerted upwardly on the movable rail 7.

As illustrated in FIG. 1, a lock plate 8 is secured to the bottom wall 1a of the stationary rail 1 and extends longitudinally along the same. The lock plate 8 has a side wall on which a plurality of rectangular openings 8a are formed. On the top wall 7a of the movable rail 7 is secured a bracket 9 having a pair of tubular portions 9a, 9a in which an actuating shaft 10 is rotatably mounted. The actuating shaft 10 extends substantially in parallel with the movable rail 7 and is bent at its front end to which a grip 10a is secured.

The actuating shaft 10 is provided, between the tubular portions 9a, 9a of the bracket 9, with a latching plate 11 secured thereto. A lower end of the latching plate 11 is provided with pawls 11a which are bent toward the side wall of the lock plate 8 so as to engage the openings 8a. When the pawls 11a are engaged with the openings 8a by rotating the actuating shaft 10, the movable rail 7 is locked on the stationary rail 1. On the other hand, when the pawls 11a are disengaged from the openings 8a by rotating the actuating shaft 10, the movable rail 7 is allowed to move forward and rearward on the stationary rail 1. Accordingly, the seat is slidably moved together with the movable rail 7 and locked at a desired position.

Figure 4:
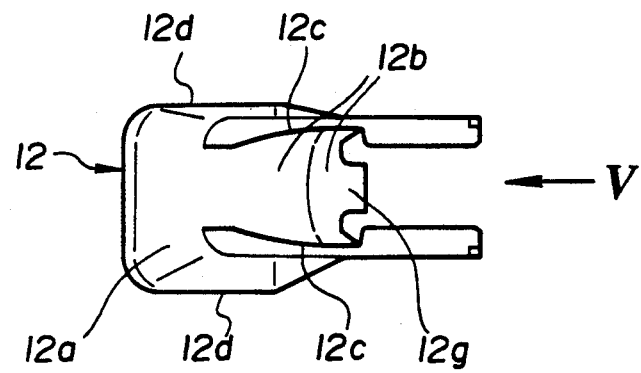
FIG. 4 is a plan view of the protective cover according to the present invention.
Figure 5:
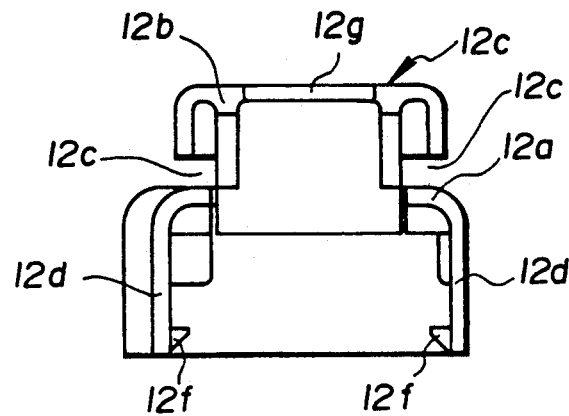
FIG. 5 is an elevation view of the protective cover, taken from a direction indicated by an arrow V.

As shown in FIGS. 4 and 6, the protective cover 12 is made of synthetic resin and includes a bracket cover portion 12a and a rail cover portion 12b. The bracket cover portion 12a encloses an outer face of the bottom wall 3c and the skirted flanges 3d, 3d. The bracket cover portion 12a has side walls 12d, 12d, on inside faces of which are formed the pawls 12e, 12e which project inwardly so as to engage with the notches 3e, 3e of the rear bracket 3. The bracket cover portion 12a is also provided with pawls 12f, 12f which project from an inside surface thereof and are fitted on lower edges of the skirted flanges 3d, 3d depending from both sides of the top wall 3a of the rear bracket 3 (see FIGS. 2 and 5). The bracket cover portion 12a has a slant top wall extending forwardly and upwardly from a rear end thereof. The slant top wall is continuously transitioned to a slant rear wall of the rail cover portion 12b in surface-aligned manner. The rail cover portion 12b also has a flat top wall which is parallel with the bottom wall 1a of the stationary rail 1 and which is continuously connected to the slant rear wall thereof. The flat top wall of the rail cover portion 12b has a protruding portion 12g which extends forwardly from a center part of the front end thereof. Upon mounting the protective cover 12 on the rear bracket 3 as indicated by an arrow of FIG. 6, the protruding portion 12g is fitted into a space defined between the side walls 1b, 1b and flush with the flanges 1c, 1c of the stationary rail 1. Thus, since the pawls 12e and 12f are engaged with the notches 3e and the flanges 3d, respectively. The protective cover 12 is fixedly secured to the rear bracket 3. The rail cover portion 12b has a rib which extends downwardly from the top wall of the rail cover portion 12b such that a lower end of the rib contacts a rearmost edge of the stationary rail 1. At the rearmost edge of the stationary rail 1, the cut-out portion 1d is provided for preventing interference with the protective cover 12.

The protective cover 12 has guide grooves 12c, 12c formed on its both side walls between the bracket cover portion 12a and the rail cover portion 12b. Upon operation, the flanges 7c, 7c of the movable rail 7 are passed through the guide grooves 12c, 12c so that the movable rail 7 can be moved rearwardly without disturbance of its slide movement on the stationary rail 1.

Thus, as shown in FIG. 1, the protective cover 12 covers not only the bottom wall 3c and flanges 3d, 3d of the rear bracket 3 but the rear end of the stationary rail 1, which provides an improvement in beauty of interior appearance of a passenger compartment of vehicles. In addition, the passenger is prevented from having damage occur to his body or baggage as a result of contact with the end exposed portions of the stationary rail 1 in the passenger compartment.

Further, the protective cover 12 may be mounted on the front bracket 4.

In addition, the protective cover 12 may be enclosed with an accessory cover 13 which has almost the same configuration as the protective cover 12 and is made of the same material as a carpet of the vehicle floor, so that the interior appearance of a passenger room can be further improved.

An alternative preferred embodiment of a seat sliding device including a protective cover according to the present invention will be described hereinafter.

Figure 8:
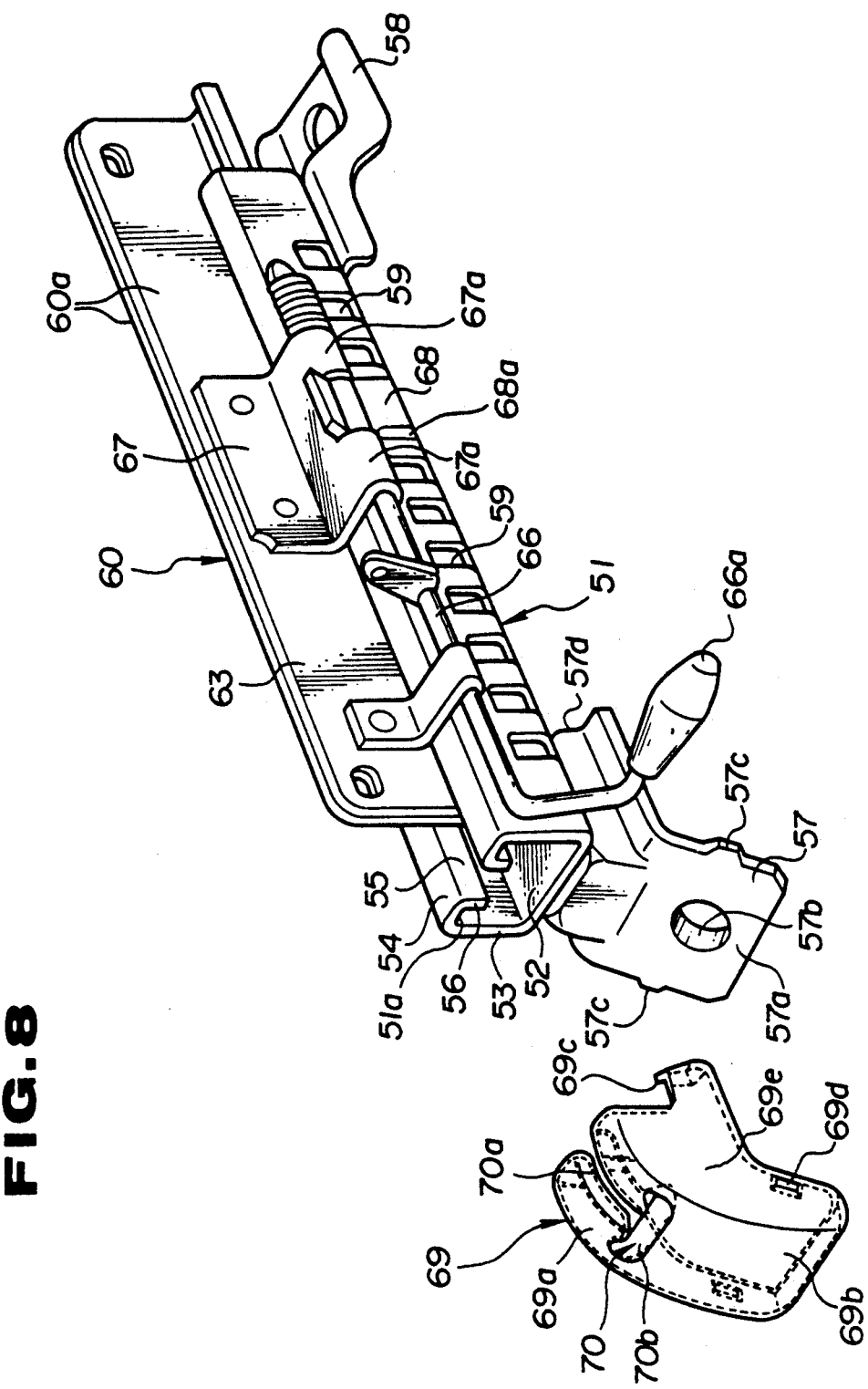
FIG. 8 is a perspective view illustrating the seat sliding device and the protective cover of FIG. 7, in disassembled state.
Figure 9:
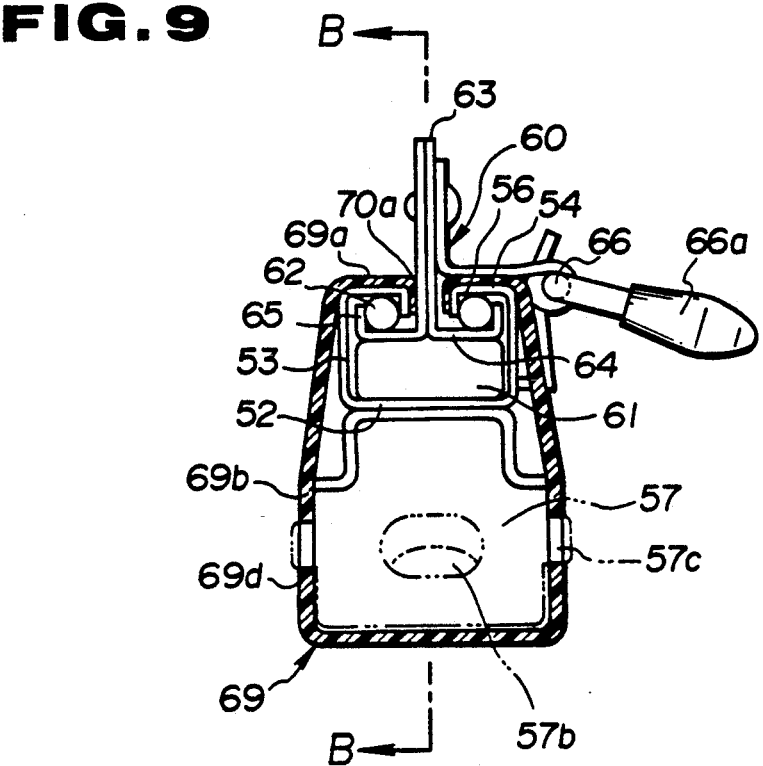
FIG. 9 is a vertical sectional view of the seat sliding device, taken along a line A—A in FIG. 7.

As illustrated in FIG. 9, a stationary rail 51 has a substantially C-shaped cross section and comprises a flat bottom wall 52, parallel side walls 53 extending upwardly from respective sides of the bottom wall 52, top walls 54 extending inwardly from upper ends of the side walls 53, and flanges 56 extending downwardly from inner ends of the top walls 54. Between the opposing flanges 56, there is provided an elongated opening 55 extending in a longitudinal direction of the stationary rail 51 (see FIG. 8).

Front and rear end portions of the bottom wall 52 of the stationary rail 51 are secured to front and rear brackets 57 and 58 by rivetting, welding or the like. As illustrated in FIG. 8, the front bracket 57 has a top wall 57d and a front wall 57a extending downwardly from a front end of the top wall 57d. The front wall 57a has at a central portion thereof a hole 57b through which a fastening means (not shown) such as bolts is inserted. On both sides of the front wall 57a are provided a pair of pawls 57c. The front and rear brackets 57 and 58 are secured to a vehicle floor (not shown) by the fastening means. Thus, the stationary rail 51 is secured to the vehicle floor through the front and rear brackets 57 and 58.

Referring to FIG. 9 in which the seat sliding device is illustrated in an assembled state, a movable rail 60 is made of a pair of steel plates 60a, 60a each having an L-shaped cross section, which are attached together to form a T-shaped body portion as a whole. The T-shaped movable rail 60 includes a base portion 64 received in a cavity defined by the respective walls of the stationary rail 51, and a vertical portion 63 extending upwardly from the base portion 64 through the opening 55 of the stationary rail 51. Flanges 65 extend upwardly from both side edges of the base portion 64. A roller 61 is interposed between the base portion 64 and the bottom wall 52 so that the base portion 64 is maintained in spaced and parallel relation with the bottom wall 52 of the stationary rail 51. A plurality of balls 62 are rotatably arranged in a space defined by the flanged base portion of the movable rail 60 and the flanged top wall of the stationary rail 51. Thus, the stationary and movable rails 51 and 60 are assembled through the roller 61 and balls 62 in an interlocked manner whereby the movable rail 60 is more smoothly slidable on the stationary rail 51. The movable rail 60 is secured to a seat at the vertical portion 63 by fastening means such as bolts.

As shown in FIG. 8, a bracket 67 is secured to one side of the vertical portion 63 of the movable rail 60. The bracket 67 has on the front and rear sides a pair of tubular support portions 67a, 67a in which an actuating shaft 66 is rotatably supported. The actuating shaft 66 extends substantially in parallel with the movable rail 60 and has a bent front end portion on which a grip 66a is mounted.

The actuating shaft 66 is provided, between the tubular support portions 67a, 67a of the bracket, with a latching plate 68 secured thereto. The latching plate 68 is provided at its lower end with pawls 68a extending toward the side wall 53 of the stationary rail 51. A plurality of rectangular notches 59 are formed on the side wall 53 in a longitudinally aligned and spaced relation with each other. The pawl 68a is engaged with the notch 59 by rotating the actuating shaft 66 in one direction, so that the movable rail 60 is locked on the stationary rail 51. On the other hand, when the actuating shaft 66 is rotated in the reverse direction, the pawl 68a is disengaged from the notch 59 and the movable rail 60 is allowed to move forward and rearward on the stationary rail 51. Accordingly, the seat mounted on the movable rail 60 is slidably moved and locked at a desired position in the fore and aft longitudinal direction.

Figure 7:
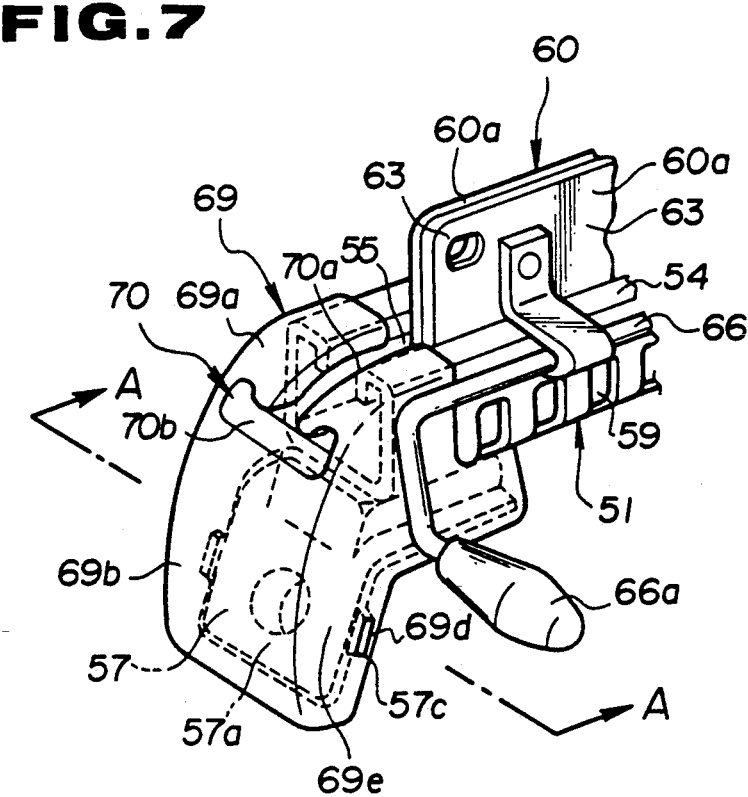
FIG. 7 is a partial perspective view of a seat sliding device with a protective cover according to another preferred embodiment of the present invention.
Figure 10:
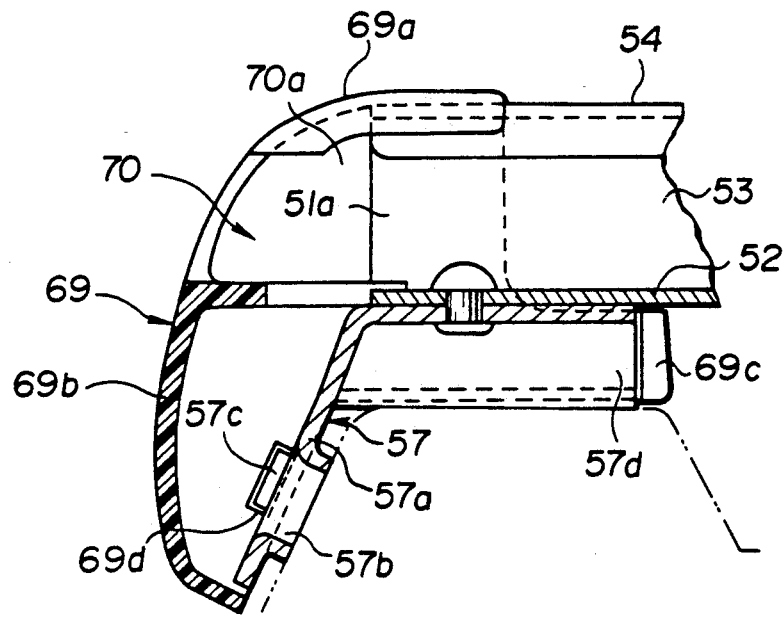
FIG. 10 is a sectional view of the seat sliding device, taken along a line B—B in FIG. 9.

As illustrated in FIG. 8, a protective cover 69 includes an upper rail cover portion 69a and a lower bracket cover portion 69b, which are integrally formed of synthetic resin. As shown in FIGS. 7, 9 and 10, the upper rail cover portion 69a has a reverse T-shaped guide groove 70 including a vertical groove 70a extending at a center thereof in the longitudinal direction of the stationary rail 51 and a lateral groove 70b extending perpendicular to the vertical groove 70a. As a result, the upper rail cover portion 69a is shaped so as to fit on the front end 51a of the stationary rail 51. Namely, when the protective cover 69 is mounted on the stationary rail 51, the rail cover portion 69a encloses the respective outer surfaces of the side and top walls 53 and 54 and the flanges 56 of the stationary rail 51. Upon assembly, the vertical groove 70a is flush with the top opening 55 of the stationary rail 51 while the lateral groove 70b is aligned with a portion of the inside space of the stationary rail 51, where the base portion 64 of the movable rail 60 is disposed horizontally. Accordingly, this configuration of the guide groove 70 allows the movable rail 60 to forwardly pass through the guide groove 70 without disturbance of slide movement thereof. The bracket cover portion 69b extends continuously downwardly from a lower end of the rail cover portion 69a in surface-aligned manner and encloses an outer surface of the front bracket 57. The bracket cover portion 69b has side walls 69e which are elongated rearwardly to cover the skirted flange portions of the front bracket 57 and bent inwardly so as to be formed with rear flanges 69c (see FIGS. 8 and 10). The rear flanges 69c are hooked on both sides of rear end 57d of the front bracket 57 to cover the same. At lower portions of the side walls 69e are provided notches 69d into which the pawls 57c are fitted. The engagement allows the protective cover 69 to be secured to the front bracket 57.

As similar to the aforementioned first preferred embodiment, the protective cover 69 may be mounted on the rear bracket 58.

Further, the protective cover 69 may be enclosed with an accessory cover which has almost the same configuration as the protective cover 69 and is made of the same material as a carpet for the vehicle floor.

As is obvious from the aforementioned preferred embodiments, the seat sliding device according to the present invention contributes to an improvement in interior appearance of the passenger compartment and safety for the passenger.

What is claimed is:

1. A seat sliding device including a stationary rail secured at both ends thereof to a floor through brackets, a movable rail slidably engaged with said stationary rail and mounting thereon a seat, and a protective cover for covering one of said brackets and said stationary rail, wherein said protective cover comprises:
   a bracket cover portion covering the bracket;
   a rail cover portion integrally connected to said bracket cover portion and covering an end portion of the stationary rail; and
   a first guide groove which allows the movable rail to pass through said protective cover without disturbance.

2. A seat sliding device as claimed in claim 1, further comprising a second guide groove which allows the movable rail to pass through said protective cover without disturbance and wherein said first and second guide grooves are formed on opposite side walls of said protective cover between said bracket cover portion and said rail cover portion.

3. A seat sliding device as claimed in claim 1, wherein said bracket cover portion has engaging means for mounting said bracket cover portion on the bracket.

4. A seat sliding device as claimed in claim 1, wherein said first guide groove comprises a vertical groove and a lateral groove extending perpendicular to said vertical groove.

5. A seat sliding device as claime in claim 1, wherein said protective cover is covered with an accessory cover which has substantially the same configuration as said protective cover and is made of the same material as a carpet for said floor.

6. A seat sliding device as claimed in claim 3, wherein said engaging means includes a pawl which is integrally formed with one of said bracket cover portion and the bracket, and a notch which is formed on the other of said bracket cover portion and the bracket.

7. A seat sliding device as claimed in claim 3, wherein said engaging means includes a pawl which is integrally formed with said bracket cover portion and engage with so as to the bracket.

8. A seat sliding device as claimed in claim 1, wherein said rail cover portion includes a top wall flush with an uppermost part of the end portion of the stationary rail.

* * * * *